Nov. 3, 1970         S. F. KAPFF         3,537,298
METHOD AND APPARATUS FOR DETECTING LEAKAGE IN TANKS
CONTAINING FLUIDS
Filed Oct. 31, 1968                    4 Sheets-Sheet 2

INVENTOR.
Sixt Frederick Kapff

BY *Johnny J. Connors*
ATTORNEY

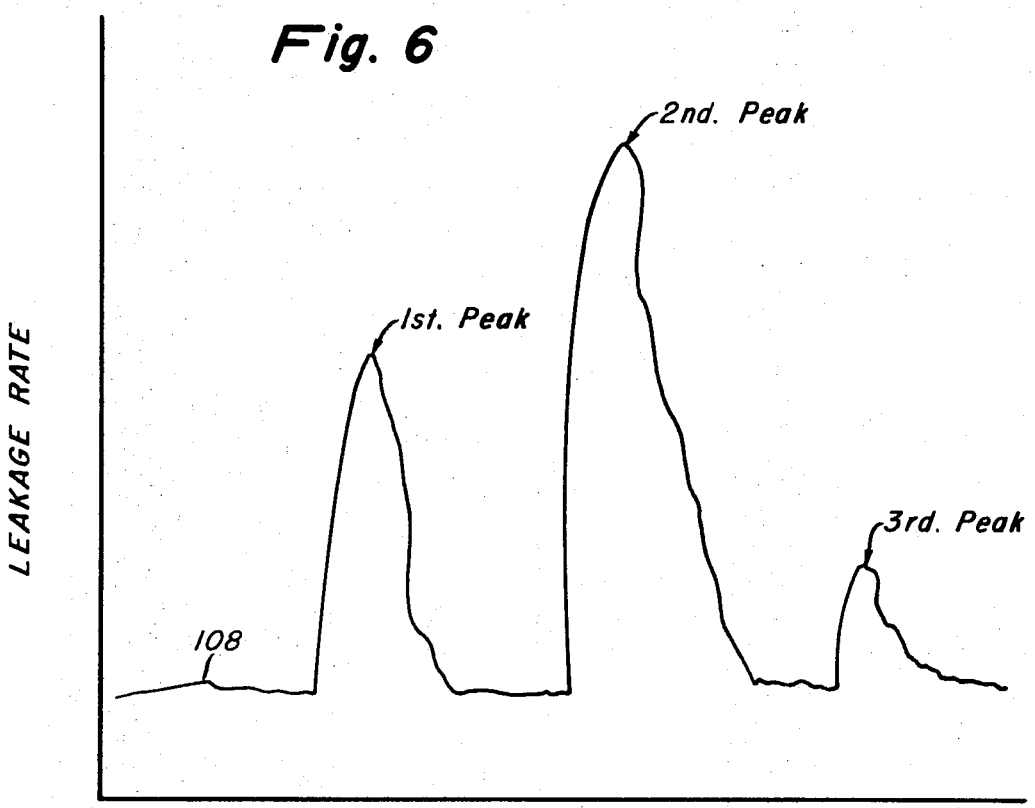
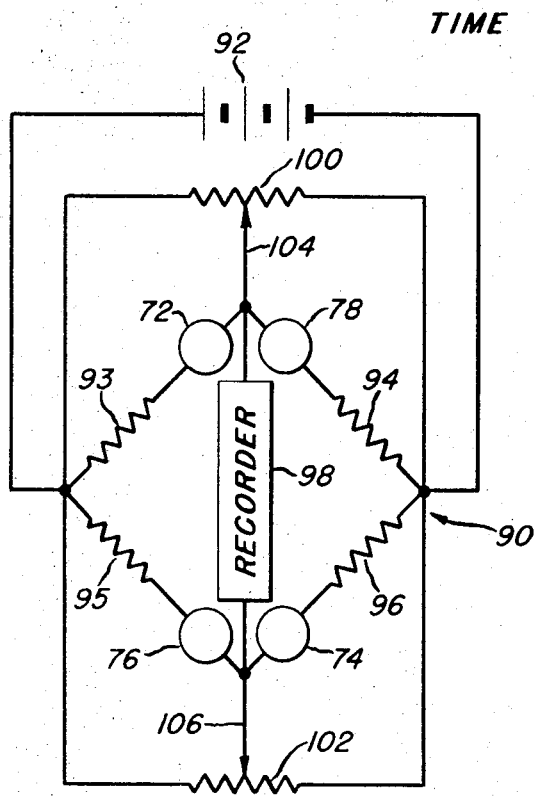

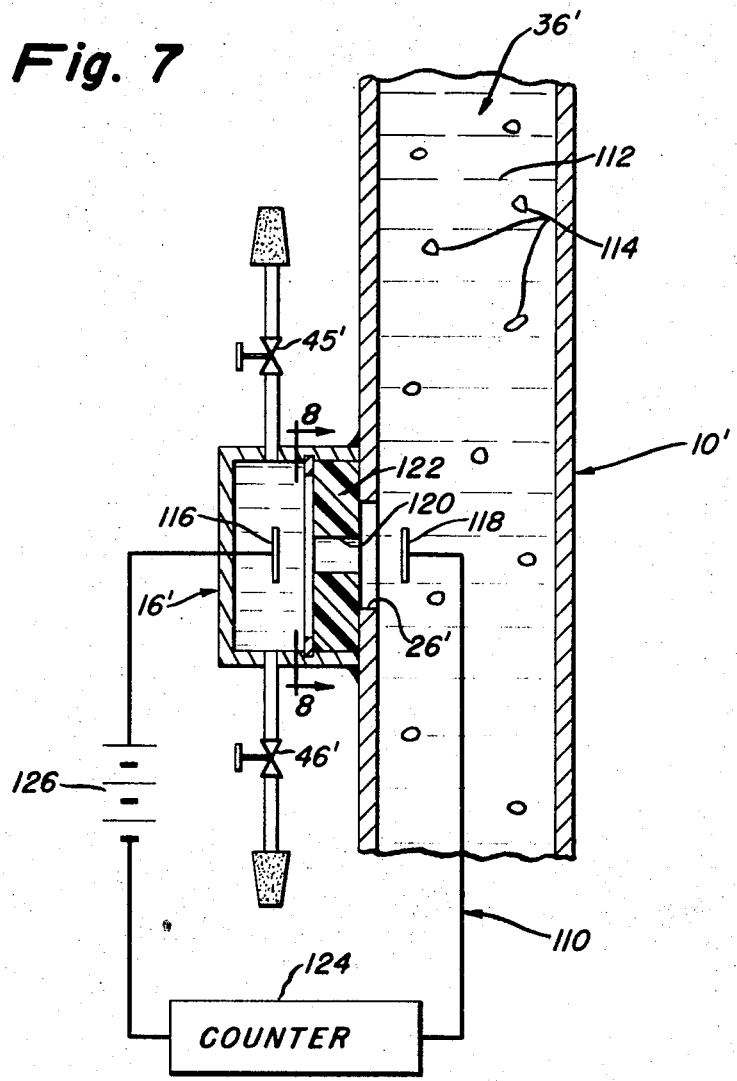
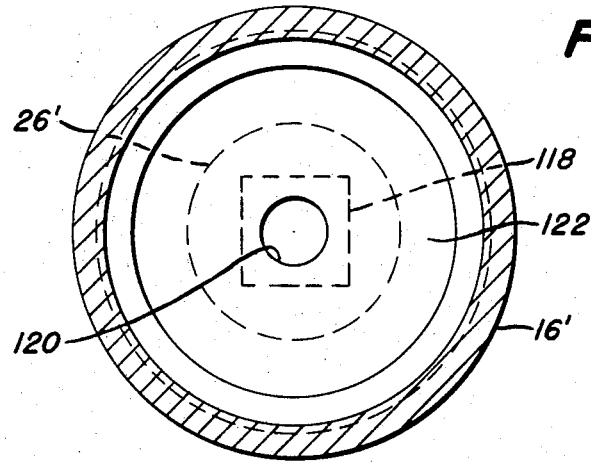

United States Patent Office 3,537,298
Patented Nov. 3, 1970

3,537,298
METHOD AND APPARATUS FOR DETECTING LEAKAGE IN TANKS CONTAINING FLUIDS
Sixt Frederick Kapff, Homewood, Ill., assignor to Standard Oil Company, Chicago, Ill., a corporation of Indiana
Filed Oct. 31, 1968, Ser. No. 772,303
Int. Cl. G01m 3/00
U.S. Cl. 73—49.2                                   14 Claims

ABSTRACT OF THE DISCLOSURE

This invention concerns a method and apparatus for detecting leaks in tanks which contain fluids. The method calls for placing the tank into communication with a chamber adapted to receive fluid so that the pressures in the tank and the chamber come to equilibrium, discontinuing communication for a suitable interval, then again placing the tank and chamber into communication, and detecting if fluid flows between the tank and chamber. The apparatus includes a member having a chamber adapted to receive fluid, port means in the chamber having valve means, and flow detecting means at the port means which give a signal when fluid flows between the tank and chamber. Preferable the chamber is made of a material having virtually a zero coefficient of expansion at normal ambient temperatures. This invention also concerns a novel flow detector comprising a thermistor and a plug adapted to be inserted in the port means or a like conduit. The plug has a pinhole-like opening in it, and the thermistor, which is one element in a bridge circuit, is mounted in the opening to only partially impede fluid flow through said opening. Fluid flow past the thermistor unbalances the bridge circuit. Another device which may be used to detect flow is a Coulter counter.

BACKGROUND OF THE INVENTION

Undetected slow leakage of gasoline from rusted-out or puncture storage tanks is a serious fire hazard, and present methods for detecting such tank leakage are complicated and unreliable. For example, the American Petroleum Institute method for detecting underground gasoline storage tank leakage requires: (a) filling the tank completely with gasoline, (b) attaching a calibrated, transparent tube to the flange of the tank's fill pipe, (c) adding more gasoline to the tank in order to bring the liquid level up into the tube, (d) stirring the gasoline in the tank to aid in maintaining a uniform temperature throughout the gasoline, and (e) watching the liquid level in the tube to see if it changes over a period of time—a drop in liquid level normally indicates that the tank leaks.

This method must take into account changes in temperature and tank bulging. Hence, it is necessary to continually monitor temperature during the test period to the nearest 0.01° F., and if temperature changes, to make allowances for this. Moreover, due to the increased pressure of a full load, the tank's ends gradually bulge. Consequently, the liquid level in the tube drops and the tank appears to be leaking. Again allowances must be made. These allowances can only be made by a qualified expert capable of interpreting test results, and even then, there is often doubt about the validity of the test for very small leaks.

BRIEF DESCRIPTION OF THE INVENTION

I have invented a method and apparatus which determine whether storage tanks containing fluids leak, and which avoid the problems previously encountered in attempting to detect such leaks. For example, the tank need not be filled to capacity, thus it does not bulge during testing, and changes in temperature during the test period need not be considered because they have no bearing on test results. My method and apparatus can be used to test for leaks in either underground or above ground storage tanks, regardless of whether these tanks store liquids or gases. The preferred embodiments of my apparatus are particularly well adapted to be used in testing leaks in tanks storing liquids, particularly underground gasoline storage tanks, but my invention is not limited exclusively to this use.

According to my method, the storage tank containing fluid is first placed into communication with a chamber adapted to receive fluid. As will be brought out in greater detail below, this chamber may be prefilled with a conductive liquid containing suspended particles or with liquid stored in the tank. With the tank and chamber in communication, the pressure in the tank and chamber come to equilibrium. Once pressure is equalized, communication between the tank and chamber is discontinued for a suitable time interval, and at the end of the interval, the tank and chamber are once again placed into communication with each other. If the tank leaks, then the pressure in the tank will no longer equal the pressure in the chamber. Consequently, fluid will flow between the tank and chamber. Detection of this flow indicates the existence of a leak.

My novel apparatus includes an elongated, hollow, tubular member which can be inserted into the tank through the tank's fill pipe. This member has a chamber adapted to receive liquid, and a port in the chamber provides the means for allowing liquid to flow into or from the chamber. At this port is at least one valve that can be opened or closed while the apparatus is inside the tank. Also at this port is a flow detector.

In use, the person conducting the test opens the valve and inserts the apparatus through the fill pipe and into the tank. Liquid fills the chamber, and the pressure inside the chamber and the tank are equalized. The valve is then closed. Then after about one hour or so, the valve is once again opened. If the tank leaks, the liquid level inside the chamber will be different than the liquid level inside the tank, and a differential in pressure between the tank and chamber exists. This causes flow through the port which is detected by the flow detector.

Using my apparatus to test for leaks in a 5,000 gallon underground gasoline storage tank, I have been able to detect leakage from such tanks which is as little as 1½ gallons per day. Such a small leakage constitutes a change in liquid level in the tank of about $\frac{1}{1000}$ of an inch or less. The normal time interval needed to detect this small leakage is about one hour. To detect smaller leaks, it may be necessary to use a longer test interval.

Preferably the chamber is made of a material which has virtually a zero coefficient of expansion at normal ambient temperatures. One such preferred material is a metal alloy made principally of iron and nickel. The nickel constitutes about 36 weight percent of the alloy, and the iron constitutes about 64 weight percent of the alloy, but minor amounts of other ingredients are also present. This alloy, which is sold by the Carpenter Steel Corporation under the trade name Invar, does not expand noticeably over a temperature ranging between about 0° F. and about 200° F.

When the chamber is made of Invar or the like, the volume of the chamber will remain constant even though the liquid expands or contracts with changing temperatures. Since the liquid both inside the tank and inside the chamber is the same, changes in ambient temperatures cause this liquid to change in volume by the same proportionate amount. Consequently when the tank is not leaking, the liquid levels in the tank and chamber remain equal so long as the chamber does not change volume with changes in temperature. If the chamber did change in volume with changes in temperature, the liquid level in the chamber would be different than the liquid level in the tank, indicating that the tank leaks, even though the tank, in fact, is not leaking. When the chamber is made of a material which has virtually a zero coefficient of expansion at normal ambient temperatures, false leak detections are thus avoided. However, it may be possible in some instances to conduct the test at constant temperatures. Then the chamber need not be made of Invar or the like.

I have also invented a novel flow detector which is sensitive to almost any slight flow. This flow detector also detects any differential in pressure between the tank and chamber. The preferred embodiment of the flow detector comprises a thermistor and a plug adapted to be fitted into the port in the chamber or any suitable conduit. Preferably the plug is made of electrically insulating material such as nylon. This plug has a pinhole-like opening therein through which fluid may flow, and the thermistor is mounted centrally with said opening. But, since the thermistor is smaller than the opening, flow through the opening is only partially impeded. The opening circumscribes an area which is no more than about 10 times, preferably no more than 5 times, the area occupied by the thermistor, and, as will be brought out later in this description, this area relationship accounts for the ability of the flow detector to sense very slight flow. Desirably the opening and thermistor have a circular cross-section, and the diameter of the opening will range between about .016 inch to about .022 inch, and the diameter of the thermistor will range between about .010 inch and about .015 inch.

The thermistor is connected in a conventional bridge circuit, and current flows through the thermistor, heating it to a temperature slightly above ambient temperature. The bridge is balanced so long as liquid does not flow through the opening and past the thermistor. If a difference in pressure exists between the tank and chamber, liquid will flow through the opening past the thermistor, cooling it. This unbalances the bridge. Means connected across the bridge responds to this unbalanced condition and provides a signal to indicate that the tank is leaking.

I have also found it desirable to connect a reference thermistor in the bridge circuit to compensate for changes in ambient temperatures during the test interval. This reference thermistor, which has about the same temperature response characteristics as the flow detecting thermistor, is mounted on the surface of the plug. As the temperature of the liquid surrounding the flow detector changes, the change in resistance of both these thermistors will be substantially the same. Consequently, the bridge remains balanced. But, since liquid is only capable of flowing past the thermistor in the opening, when flow does not occur, these two thermistors will have a different resistance and the bridge circuit will be unbalanced.

The advantages of my method and apparatus are manifold. My apparatus is simple to operate and calibrate, easy to construct, and it gives reliable performance. Because the chamber is made of Invar or the like, changes in ambient temperatures of liquid in the tank being tested will not affect the accuracy of the test. Moreover, because the tank being tested does not have to be filled to capacity, problems associated with tank bulking are eliminated. My flow detector is a highly sensitive instrument, which is also easy to construct and highly reliable. But the most outstanding advantage is that my invention provides a simple and economical solution to a serious problem which has continually plagued the petroleum industry.

BRIEF DESCRIPTION OF THE DRAWINGS

FIG. 5 is the circuit diagram for the flow detector of my invention.

FIG. 6 is a recording chart provided by the recorder shown in FIG. 5.

FIG. 7 illustrates using a Coulter counter as a flow detector.

FIG. 8 is a cross-sectional view taken along line 8—8 of FIG. 7.

DESCRIPTION OF THE PREFERRED EMBODIMENT

Figure 1:
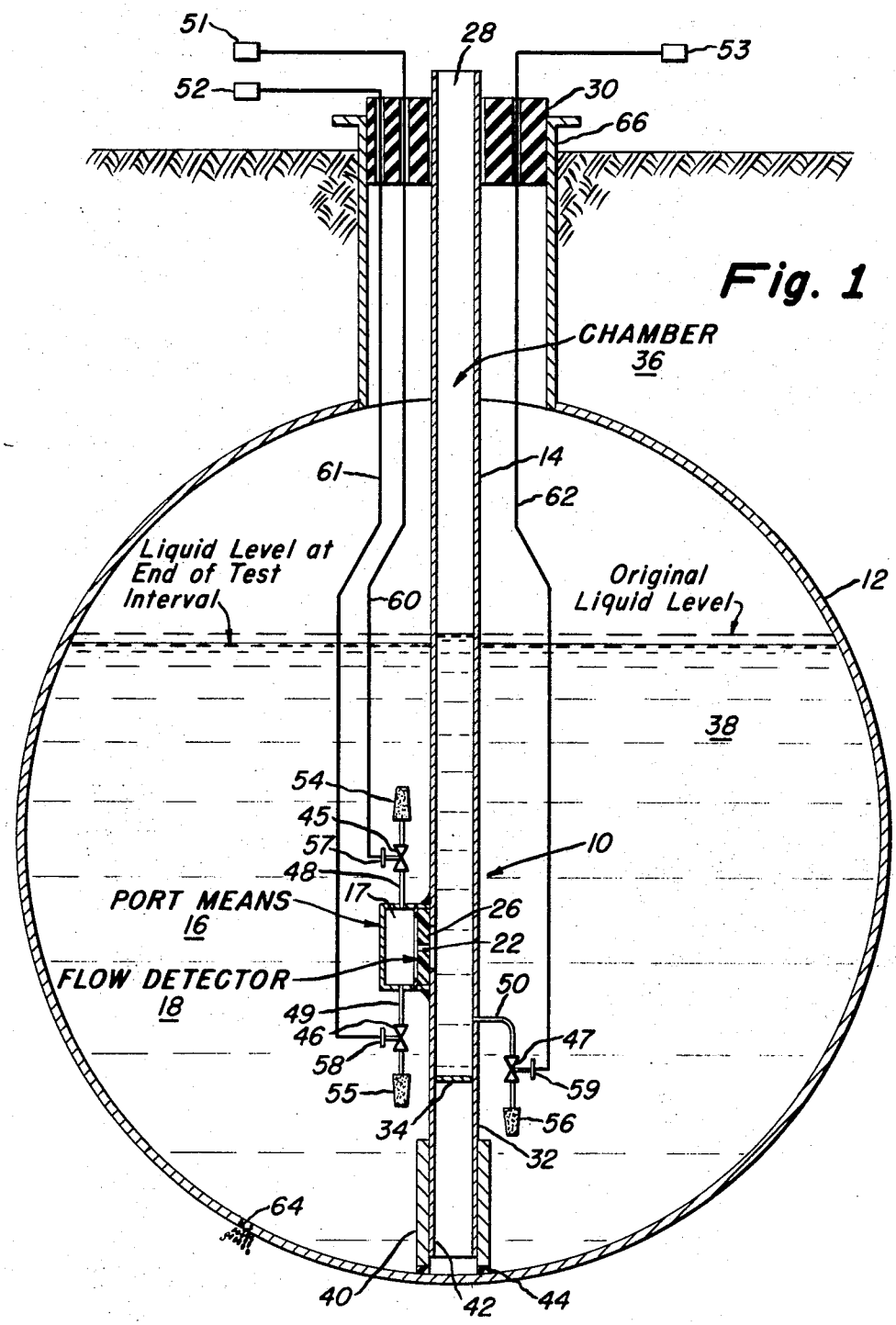
FIG. 1 is a schematic drawing illustrating using my novel apparatus to test for leaks in an underground storage tank.
Figure 2:
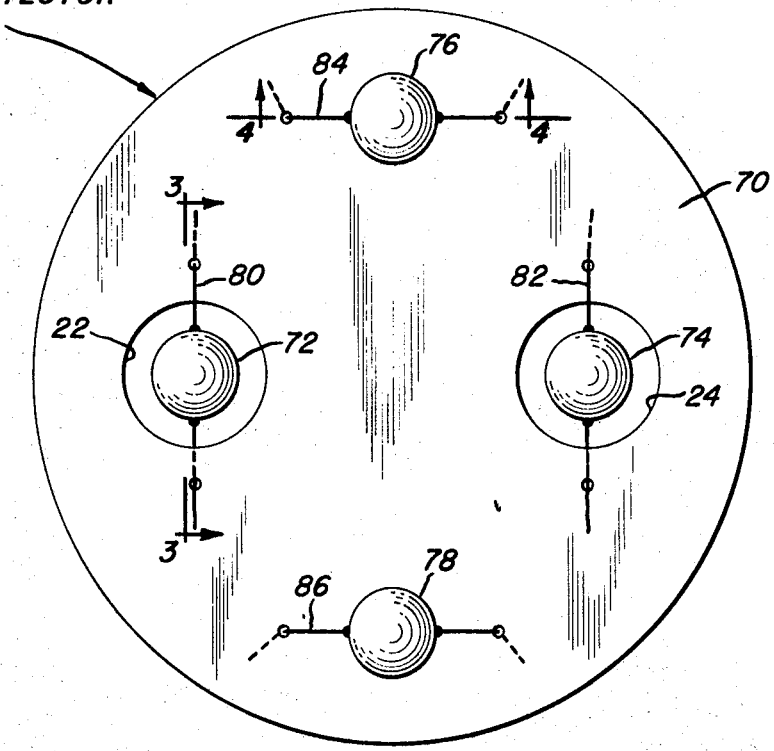
FIG. 2 is an enlarged detail of the flow detector shown in FIG. 1.

As shown in FIG. 1, leak detecting apparatus 10 is adapted to be conveniently inserted into underground storage tank 12. Apparatus 10 includes: a hollow, tubular member 14 made of Invar; Invar port means, generally indicated as 16, welded to member 14; and, securely mounted within cavity 17 of the port means, flow detector 18 having therein two pinhole-like openings 22 and 24 (FIG. 2). Openings 22 and 24 are in communication with opening 26 in member 14. Upper end 28 of member 14, which is open to the atmosphere, extends through a passageway in stopper 30, and intermediate portion 32 is closed by plate 34, thereby providing pressure chamber 36, which is adapted to receive liquid 38 contained in tank 12. Magnet 40, which is attached to bottom end 42 of member 14, and stopper 30 provides means for holding apparatus 10 stationary while it is inside tank 12. Rubber pad 44 glued to magnet 40 cushions apparatus 10 as it rests on the floor of tank 12. Three valves, 45, 46, and 47, which are connected respectively to tubes 48, 49, and 50, and remotely operated, respectively, by controls 51, 52, and 53 provide means for placing chamber 36 into communication with tank 12 via port means 16 and openings 22, 24, and 26. Tubes 48–50 have filters 54–56, and when valves 45–47 are open, liquid 38 first passes through these filters before it flows into chamber 36. Thus, any dirt particles or the like contained in liquid 38 are entrapped in filters 54–56, and will not clog openings 22 and 24. Because three valves are used, chamber 36 can be quickly filled; however, the number of valves is not critical. Valves 45–47 operate like stopcocks so that liquid in chamber 36 is not displaced when they are opened and closed. Actuating controls 51–53 activate pneumatic operators 57–59, with operating pressure being supplied through hoses 60–62.

Tank 12 is shown having hole 64 through which liquid 38 leaks. To detect this leakage, apparatus 10 is first inserted into tank 12 through the tank's fill pipe 66, and stopper 30 is pushed over end 28 and into the mouth of fill pipe 66. Valves 45–47 are initially open so that liquid 38 rushes into chamber 36 and port means 16 until the liquid level in the chamber is equal to the liquid level in tank 12. Valves 45–47 are then closed, and a suitable interval is allowed to pass before they are once again opened. The liquid level in tank 12 slowly falls during the test interval as liquid seeps out hole 64. FIG. 1 illustrates the difference in liquid levels at the end of the test interval. Valve 45 or 46 is opened once again to allow liquid in chamber 36 to flow past detector 18 and out port means 16 through the opened valve. Detector 18 responds to the flow and gives a signal indicating that tank 12 is leaking. I have found that, because detector 18 of my invention is such a sensitive instrument, it is usually advisable to cover end 28 with a plastic bag or the like. If the tank has other vents, these should also be covered in a like manner. This prevents wind gusts from interfering with the operation of detector 18.

Figure 3:
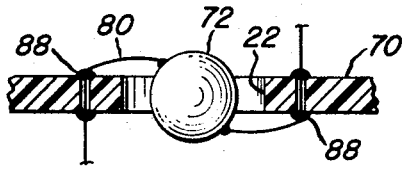
FIG. 3 is a cross-sectional view taken along line 3—3 of FIG. 2.
Figure 4:
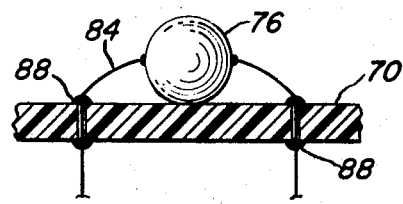
FIG. 4 is a cross-sectional view taken along line 4—4 of FIG. 2.

The preferred embodiment of flow detector 18 is shown in FIGS. 2 through 5. Detector 18 includes a wafer-like nylon plug 70, which is adapted to be inserted inside port means 16, and mounted to plug 70, two flow detecting thermistors 72 and 74, and two reference thermistors 76 and 78. Although a flow detector coming within the scope of my invention can be built which employs only a single flow detecting thermistor, I prefer to use two flow thermistors in order to make detector 18 more sensitive to slight flows. If the temperature is going to vary during the test interval, then it is also desirable to use one or more reference thermistors. Thermistors 72 and 74 are mounted in an identical manner, respectively, in openings 22 and 24, and thermistors 76 and 78 are also mounted in an identical manner on the surface of plug 70. Thermistors 72 and 74 are smaller than the openings 22 and 24 so that they only partially impede liquid flow through these openings. As shown in FIGS. 3 and 4, conductive wires 80 and 82, connected respectively to thermistors 72 and 74, are threaded through plug 70, and conductive wires 84 and 86, connected respectively to thermistors 76 and 78, are also threaded through the plug. An epoxy glue 88 holds these wires in a fixed position.

One problem encountered using thermistors 72 and 74 to detect flow is that the resistances of these thermistors fluctuate slightly in a random fashion. Because current is flowing through thermistors 72 and 74, these thermistors will always be at a slightly higher temperature than surrounding liquid 38. This temperature gradient establishes small convection currents which are responsible for the slight fluctuations in the resistances of thermistors 72 and 74. I have found that the relationship between the area circumscribed by either opening 22 or 24, and the area occupied by either thermistor 72 or 74 must be such that, when flow is occurring, thermistor resistance change will be appreciably different from the resistance fluctuations caused by convection currents. In most instances, this calls for the areas circumscribed by opening 22 and 24 to be no more than about 10 times, preferably no more than 5 times, greater than the area occupied by thermistors mounted therein. As previously mentioned, openings 22 and 24 and thermistors 72 and 74 desirably have a circular cross-sectional area, and the diameters of the openings will range between about .016 inch and about .022 inch, and the diameters of the thermistors will range between about .010 inch and about .015 inch.

FIG. 5 shows the thermistors connected together in a conventional Wheatstone bridge circuit 90. Battery 92 supplies power to circuit 90, and resistors 93–96 serve to limit the current flowing through the thermistors. This prevents damaging the thermistors. Recorder 98, which is connected across circuit 90, prints out a peak (FIG. 6) when the circuit is unbalanced. Two potentiometers 100 and 102 are connected to bridge 90 and recorder 98, and they are ganged together. Initially sliders 104 and 106 of potentiometers 100 and 102 are adjusted to balance bridge circuit 90. So long as flow detector 18 is in contact with a quiescent liquid, bridge circuit 90 remains balanced. If the temperature of this liquid changes, bridge circuit 90 will still remain balanced because the resistance change of the flow detecting thermistors 72 and 74 is compensated for by the change in resistance of the reference thermistors 76 and 78. However, when liquid flows through openings 22 and 24 and past thermistors 72 and 74, then a difference in resistance between flow detecting thermistors 72 and 74 and reference thermistors 76 and 78 exists, and bridge circuit 90 becomes unbalanced. The placement of flow detecting thermistors 72 and 74 in opposite legs of bridge circuit 90 reinforces an unbalanced condition with liquid flow, and recorder 98 responds to this unbalanced condition and provides a signal in the form of a print-out.

FIG. 6 shows a typical print-out of recorder 98 wherein the base line 108 indicates that circuit 90 is balanced, and the peaks indicate that circuit 90 is unbalanced and that tank 12 is leaking. The height of a peak, or more correctly, the area under the peaked curves, indicates the rate of leakage. Apparatus 10 is calibrated by filling chamber 36 and port means 16, closing valves 45–47, and then withdrawing a given amount of liquid 38 from tank 12. Valve 45 or 46 is then opened to allow liquid 38 to flow back into tank 12. A peak appears on the chart, and the height of the peak and area under the peak corresponds to the amount of liquid withdrawn from tank 12. This process can be repeated by withdrawing several different amounts of liquid 38 from tank 12 to provide a number of peaks of different heights corresponding to a range of different leakage rates.

Apparatus 10 can be used to detect whether liquid 38 is leaking from tank 12 or seeping into it. To illustrate, apparatus 10 is calibrated, and a test is made to see if tank 12 leaks. The first peak shown in FIG. 6 indicates that a leak is present, but this peak alone will not indicate whether liquid is seeping into or from tank 12. An amount of liquid 38 is then withdrawn from tank 12 which corresponds to about the same amount of leakage indicated by the first peak. Using the same test interval, another test is performed. If recorder 98 prints out a peak which is higher than the first peak, such as the second peak, then liquid 38 is leaking from tank 12. If recorder 98 prints out a peak lower than the first peak, such as the third peak, then liquid is seeping into tank 12.

FIGS. 7 and 8 illustrate using a conventional Coulter counter to detect flow. Apparatus 10', shown in these figures, is substantially the same as apparatus 10 shown in FIG. 1, with the exception that Coulter counter 110 is used in place of flow detector 18 and the chamber 36' is prefilled with a conductive liquid medium 112 containing suspended particles 114. Coulter counter 110 includes two electrodes 116 and 118 disposed on opposite sides of a small orifice 120 in a suitable partition piece 122 disposed within port means 16'. Electrodes 116 and 118 are connected together through a circuit including counter 124 and battery 126. Orifice 120 must be large enough so that particles 114 can pass therethrough, and if the tank being tested leaks when valve 45' or 46' is opened after the expiration of a suitable test interval, particles 114 will flow through opening 120 between electrodes 116 and 118. Particles 114 interrupt current flow between electrodes 116 and 118, and counter 124 counts these interruptions. If the number of interruptions exceeds a predetermined value, then this indicates that the tank being tested leaks.

My invention can be used to detect leaks in almost any type of fluid containing means. Obviously, apparatus 10 may have to be modified to adapt it to a particular type of containing means. For example, if apparatus 10 is used to test for leaks in tanks containing a gas then chamber 36 should be closed to the atmosphere. Such minor changes in the construction of apparatus 10 will not depart from the basic principles of my invention disclosed herein.

I claim:
1. A method for determining whether means containing a fluid is leaking, comprising the steps of:
   (a) placing the containing means into communication with a chamber adapted to receieve fluid so that the pressure in the containing means and the pressure in the chamber attain equilibrium;
   (b) discontinuing communicatiton between the containing means and the chamber for a predetermined interval;
   (c) placing the containing means again into communication with the chamber so that, if said equilibrium no longer exists, fluid flows between the containing means and chamber; and
   (d) detecting any flow between the containing means and chamber, whereby a detection of flow indicates a leak in the containing means.
2. A method for determining whether a tank containing liquid leaks, comprising the steps of:
   (a) inserting into the tank a chamber adapted to receive liquid;

(b) placing the tank and chamber into communication so that the chamber is filled with the liquid contained in the tank, whereby the level of the liquid in the tank and the level of liquid in the chamber attain equilibrium;

(c) discontinuing communication between the tank and chamber for a predetermined interval;

(d) placing the tank again into communication with the chamber so that, if the liquid levels in the tank and chamber are no longer equal, liquid flows between the tank and chamber; and (e) detecting any liquid flow between the tank and chamber, whereby a detection of said flow indicates a leak in the tank.

3. Apparatus for determining whether means containing a fluid is leaking, comprising:

chamber means adapted to receive fluid and having port means allowing communicatiton between the containing means and said chamber means;

valve means at said port means which is operable between open and closed positions, said valve means in the open position placing the containing means into communicatiton with the chamber means so that the pressure in the containing means and the pressure in the chamber means attain equilibrium, and said valve means in the closed position discontinuing communication between the containing means and the chamber means; and means mounted at the port means which detect flow between the containing means and the chamber means and respond to such flow to provide a signal, said signal being an indication of a leak in the containing means.

4. Apparatus defined in claim 3 wherein said chamber means is made of a material which has virtually a zero coefficient of expansion at normal ambient temperatures, whereby said chamber means has a constant volume in spite of temperature fluctuations.

5. Apparatus defined in claim 4 wherein said temperatures range from about 0° F. to about 200° F.

6. Apparatus defined in claim 3 wherein said flow detecting means includes:

plug means having therein at least one pinhole-like opening which permits fluid to flow between the chamber means and the containing means;

thermistor means mounted in said opening which changes resistance as fluid flows through said opening and past said thermistor means; and bridge circuit means, including said thermistor means, which is unbalanced as the thermistor means changes resistance with fluid flow, and meter means which give a signal indicating said bridge unbalance.

7. Apparatus defined in claim 6 wherein the diameter of said opening ranges between about .016 inch and about .022 inch, and the diameter of the thermistor ranges between about .010 inch and about .015 inch.

8. Apparatus defined in claim 3 particularly adapted to be used with containing means for liquids, such apparatus having the chamber means prefilled with a conductive liquid medium having finely divided particles suspended therein, and employing flow detecting means including a member having an orifice therein, a pair of electrodes spaced apart on opposite sides of said orifice, means coupled to said electrodes for generating current between said electrodes, said current being interrupted whenever particles pass through said orifice and between the electrodes, and means for detecting interruption of said current and for providing thereupon a signal.

9. Apparatus for determining whether a tank containing liquid leaks, comprising:

a chamber, adapted to be inserted into the tank, which receives liquid and is made of a material having virtually a zero coefficient of expansion at normal ambient temperatures;

port means in the chamber which allows liquid to flow into and from said chamber;

valve means at the port means which is operable between open and closed positions;

means coupled to the valve means for closing and opening said valve means while the member is inside the tank;

flow detecting means at said port means for detecting flow of liquid between the chamber and the tank; and means which indicate leakage, said leakage indicating means being actuated by the flow detecting means when said detecting means detects flow.

10. Apparatus defined in claim 9 additionally including filter means coupled to the valve means which filter liquid flowing into said chamber.

11. Apparatus defined in claim 10 additionally including means for maintaining the member stationary after the member has been inserted into the tank.

12. Apparatus for detecting fluid flow in conduit means and the like comprising:

first and second thermistor means having about the same temperature response characteristics;

means adapted to be inserted into the conduit means for plugging said conduit means, said plugging means having an opening therein which allows fluid to flow therethrough, said opening defining an area which is no more than about 10 times the area occupied by the first thermistor means;

means for mounting said first thermistor means in said opening in a manner which only partially impedes fluid flow through said opening, said first thermistor means changing in temperature as fluid flows through said opening and past said first thermistor means;

means for mounting said second thermistor means on said plugging means in a manner such that said thermistor means will be at about the same temperature as the first thermistor means so long as fluid is not flowing through said opening, but will be at a different temperature as fluid flows through said opening; and bridge circuit means operable between a balanced state and unbalanced state, said first and second thermistor means being connected in said circuit means so that when said thermistor means are at different temperatures the circuit means is unbalanced.

13. The combination defined in claim 12 wherein said plugging means is made of an electrically insulating material.

14. The combination defined in claim 13 wherein the first thermistor means and opening have a circular crosssectiton and the diameter of the opening ranges between about .016 and about .022 inch, and the diameter of the thermistor means ranges about .010 and about .015 inch.

References Cited

UNITED STATES PATENTS

| 2,449,556 | 9/1948 | Kirkley | 73—40 |
| 2,859,617 | 11/1958 | Adams | 73—204 |
| 3,147,618 | 9/1964 | Benson | 73—204 |
| 3,247,715 | 4/1966 | Vlasic et al. | |
| 3,460,386 | 8/1969 | Guignard | 73—290 |

LOUIS R. PRINCE, Primary Examiner

W. A. HENRY, II, Assistant Examiner

U.S. Cl. X.R.

73—204, 299

PO-1050
(5/69)

UNITED STATES PATENT OFFICE
CERTIFICATE OF CORRECTION

Patent No. 3,537,298                    Dated November 3, 1970

Inventor(s) KAPFF, SIXT FREDERICK

It is certified that error appears in the above-identified patent and that said Letters Patent are hereby corrected as shown below:

Column 3, line 22 - the word "with" should read --within--.

Column 3, line 54 - the words "does not" should read --does--.

Column 3, line 64 - the word "bulking" should read --bulging--.

SIGNED AND
SEALED
FEB 1971

FEB. 9, 1971

(SEAL)
Attest:

Edward M. Fletcher, Jr.
Attesting Officer

WILLIAM E. SCHUYLER, JR.
Commissioner of Patents